March 13, 1962  A. A. ANDREWS  3,025,098
SUN SHADE FOR AUTOMOBILE WINDOWS
Filed Dec. 8, 1960

INVENTOR.
Aaron A. Andrews
BY John A. Hamilton
Attorney.

United States Patent Office 3,025,098
Patented Mar. 13, 1962

3,025,098
SUN SHADE FOR AUTOMOBILE WINDOWS
Aaron A. Andrews, 303 W. 5th St., Garnet, Kans.
Filed Dec. 8, 1960, Ser. No. 74,636
3 Claims. (Cl. 296—97)

This invention relates to new and useful improvements in sun shades for automobile windows, and has particular reference to a sun shade for use in connection wtih the side windows of an automobile.

The principal objects of the present invention are the provision of a sun shade for automobile windows which may be attached easily and quickly to virtually any automobile, which may be shifted easily from one window to another as desired or necessary, which mounts in place securely but which may be released and removed instantly, which will not scratch or mar the glass of the window, and which may be rolled up into a very compact space for storage when not in use.

Other objects are extreme simplicity and economy of construction, and efficiency and dependabality of operation.

With these objects in view, as well as other objects which will appear in the course of the specification, reference will be had to the drawing, wherein.

Figures 2, 3:
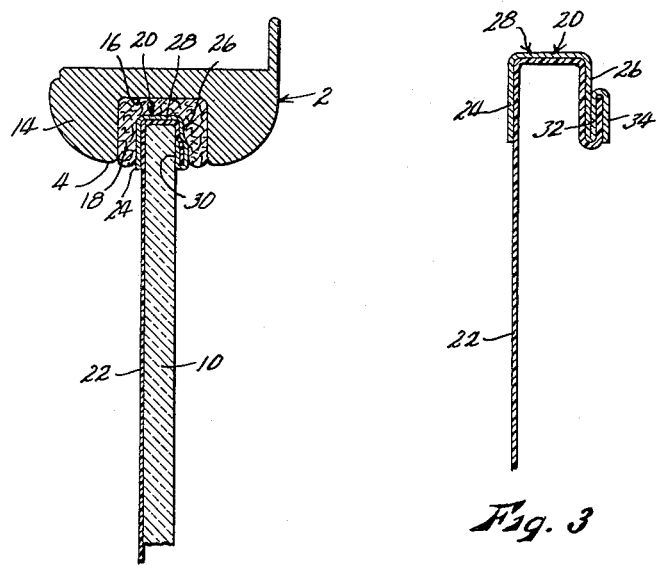
FIG. 2 is an enlarged, fragmentary sectional view taken on line II—II of FIG. 1, with the window raised to its closed position, and with the window frame portion of the door shown schematically.
FIG. 3 is a still further enlarged view similar to FIG. 2 but showing the sun shade only, said sun shade being of a slightly modified form.

Like numerals apply to similar parts throughout the several views, and the numeral 2 applies generally to an automobile door, shown fragmentarily, the upper portion of which has a window opening 4 formed therein. The door shown is a front door, and is therefore equipped with a ventilator window panel 6 at the forward side of opening 4, but this is not pertinent to the present invention. The rearward edge of said ventilator panel engages a divider strip 8 which extends vertically across opening 4 and is secured rigidly in the door frame. The rear or major portion of opening 4 is equipped with a transparent glass window 10. Said window is vertically movable in its own plane by means of any suitable mechanism, not shown, so that it may selectively be lowered entirely into the portion of the door below opening 4 to leave said opening unobstructed, or raised to cover and close said opening. It will be understood the upright portion 12 of the door at the rearward edge of the door, divider strip 8, and the horizontal portion 14 of the door bounding the upper edge of opening 4, constitute a frame for window 10, being provided with grooves 16 for engaging and guiding the window. As best shown in FIG. 2, these grooves are lined with a channel-shaped filler 18 of felt or other suitable padding material, whereby to prevent rattling or breakage of the window by vibration, and to prevent leakage of wind and water around the edges of said window.

Figure 1:
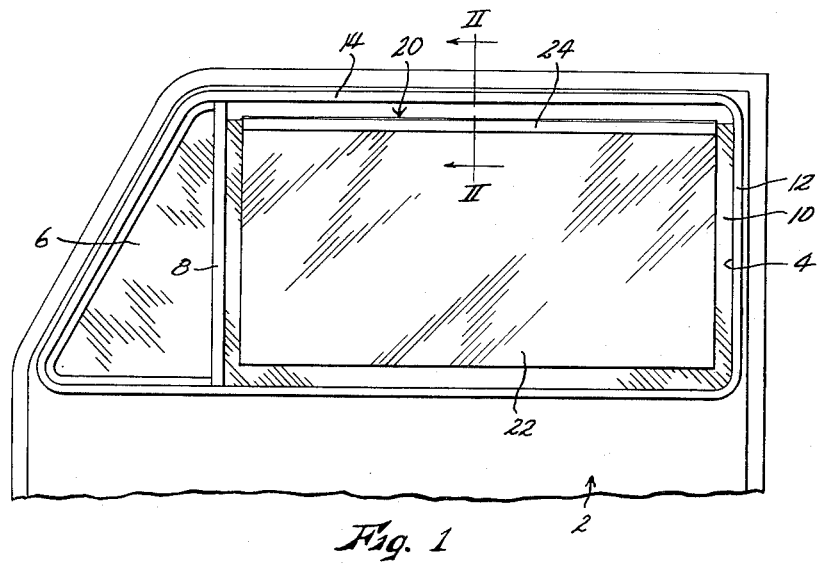
FIG. 1 is a fragmentary inside elevational view of an automobile door, showing a sun shade embodying the present invention mounted operatively on the window thereof, with said window lowered slightly from its closed position.

The sun shade forming the subject matter of the present invention comprises a mounting channel 20 and a pliable sheet 22 secured along one of its edges to said channel. As shown in FIGS. 1 and 2, the channel 20, which may be formed of thin sheet metal such as aluminum or other metal, plastic, or other suitable material, is of uniform cross-sectional contour throughout its length, having a pair of generally parallel side walls 24 and 26 spaced apart a distance slightly greater than the thickness of window 10, and a connecting wall 28. Along the open edge of the channel, side wall 26 is bent inwardly into the channel to form a longitudinal flange 30 parallel to side wall 26, and an edge of sheet 22 is clamped firmly therebetween. Sheet 22 is preferably formed of a pliable plastic film, transparent yet tinted to reduce the transmission of light therethrough. It may, however, be formed of other transparent or translucent materials, and may even be opaque where the shade is to be used where the opacity will not objectionably interfere with the driver's clear vision.

In use, the shade is very quickly and easily attached by first lowering window 10, engaging channel 20 over the upper edge of said window with sheet 22 inside the window, and again raising the window till channel 20 engages the filler 18 as shown in FIG. 2. It will be seen that sheet 22 effectively engages and lines the major portion of the inner surfaces of channel 20, thereby protecting the glass of the window against scratching or marring by the metal channel. The felt filler 18 is sufficiently compressible that it is easily deformed to accept the added bulk of the channel. Also, since the metal or other material of which the channel is formed is thin, said channel is transversely flexible, and this flexibility permits the channel to conform closely to the edge of the window when said edge is slightly curved, as is the case in some automobiles. The shade is of course applicable to any window on either side of the car. The channel 20 may be of any length desired to fit any window, or may be used in shorter lengths by shifting it along a window as may be required to shield the eyes from glare from any particular source. When the shade is not in use, sheet 22 may be wrapped about the channel 20, for storage in vary small spaces.

When it is desired to detach the shade from a window, the window is first lowered slightly to free channel 20 from filler 18, and sheet 22 is then grasped and pulled sharply downwardly. Since the sheet encircles the upper edge of the window, the downward pull elevates channel 20 upwardly, tending to free it from the glass. The channel will not be elevated completely free of the glass, due to the extension of flange 30 into the channel, but it will be at least loosened and partially removed. This feature is particularly useful where the channel has become tightly crimped on the window edge by continued pressure from filler 18.

The modification of the invention shown in FIG. 3 is substantially similar to that shown in FIGS. 1 and 2 except that side wall 26, instead of being bent inwardly, is bent first outwardly and upwardly to form a flange 32 lying against the outer surface of wall 26, then downwardly to form a flange 34 closely adjacent flange 32. An edge of sheet 22 is clamped firmly between said flanges, and is then turned inwardly to line the interior of the channel completely before depending therefrom.

This modification, while slightly more bulky and requiring slightly more material than the species shown in FIGS. 1 and 2, has at least two advantages thereover. Firstly, the channel is completely lined by the sheet so that no part of the channel ever engages the glass, and the glass is thus better protected against scratching or marring. Secondly, when the shade is detached from the glass by pulling downwardly on sheet 22, the channel will thereby be completely freed from the glass, rather than only partially as in FIGS. 1 and 2.

While I have shown and described specific embodiments of my invention, it will be readily apparent that many minor changes of structure and operation could be made without departing from the spirit of the invention as defined by the scope of the appended claims.

What I claim as new and desire to protect by Letters Patent is:

1. A sunshade for automobile windows comprising an elongated channel adapted to engage the upper edge of a window, and a sheet of pliable material secured along one of its edges to said channel adjacent the free edge of one of the side walls thereof and at no other point, said sheet extending around the interior walls of said channel to the free edge of the opposite side wall thereof, and depending therefrom.

2. A sunshade for automobile windows comprising an elongated channel adapted to engage the upper edge of a window, said channel in cross-section constituting a pair of generally parallel side walls joined by a connecting wall, one of said side walls, having along its free edge an inwardly projecting flange generally parallel to the inner surface thereof, and sheet of pliable material having one edge thereof clamped between said flange and the associated side wall, said sheet extending thence around the inner walls of said channel to the free edge of the opposite side wall, and depending therefrom.

3. A sunshade for automobile windows comprising an elongated channel adapted to engage the upper edge of a window, said channel in cross-section constituting a pair of generally parallel side walls joined by a connecting wall, one of said side walls having along its free edge an outturned flange parallel thereto, the free edge portion of said flange being turned to form a second flange parallel to said first flange, said flanges constituting clamp jaws opening in the same direction as said channel, and a sheet of pliable material having one edge thereof clamped between said jaws and extending thence around the interior walls of said channel to the free edge of the opposite side wall thereof.

References Cited in the file of this patent
UNITED STATES PATENTS

| | | |
|---|---|---|
| 1,454,498 | Whall | May 8, 1923 |
| 2,160,504 | Jacobs | May 30, 1939 |
| 2,261,301 | Smith | Nov. 4, 1941 |